(12) United States Patent
Guo et al.

(10) Patent No.: US 11,469,852 B2
(45) Date of Patent: Oct. 11, 2022

(54) SIGNAL SENDING AND RECEIVING METHOD, AND APPARATUS

(71) Applicant: Huawei Technologies Co., Ltd., Shenzhen (CN)

(72) Inventors: Zhiheng Guo, Beijing (CN); Lei Wan, Beijing (CN); Xinqian Xie, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 250 days.

(21) Appl. No.: 16/725,877

(22) Filed: Dec. 23, 2019

(65) Prior Publication Data

US 2020/0136751 A1 Apr. 30, 2020

Related U.S. Application Data

(63) Continuation of application No. PCT/CN2018/092452, filed on Jun. 22, 2018.

(30) Foreign Application Priority Data

Jun. 22, 2017 (CN) .......................... 201710482203.2
Aug. 8, 2017 (CN) .......................... 201710670232.1

(51) Int. Cl.
*H04L 1/00* (2006.01)
*H04W 76/15* (2018.01)
(Continued)

(52) U.S. Cl.
CPC .......... *H04L 1/0029* (2013.01); *H04L 5/0094* (2013.01); *H04L 5/1469* (2013.01);
(Continued)

(58) Field of Classification Search
CPC ... H04L 1/0029; H04L 5/0094; H04L 5/1469; H04L 27/2607; H04W 76/15; H04W 72/0446; H04W 72/0453
See application file for complete search history.

(56) References Cited

U.S. PATENT DOCUMENTS

| 9,497,747 B2 | 11/2016 | Damnjanovic et al. |
| 2009/0116427 A1* | 5/2009 | Marks .................... H04L 5/0007 370/328 |

(Continued)

FOREIGN PATENT DOCUMENTS

| CN | 103326806 A | 9/2013 |
| CN | 103378961 A | 10/2013 |

(Continued)

OTHER PUBLICATIONS

"Uplink operation for LTE+NR Dual Connectivity," 3GPP TSG RAN WG1 NR AH Meeting, Spokane, USA, R1-1701198 (Revision of R1-1701177), XP051222235, pp. 1-4, 3rd Generation Partnership Project, Valbonne, France (Jan. 16-20, 2017).

(Continued)

*Primary Examiner* — Michael Thier
*Assistant Examiner* — Nevena Zecevic Sandhu
(74) *Attorney, Agent, or Firm* — Leydig, Voit & Mayer, Ltd.

(57) ABSTRACT

A signal sending and receiving method and an apparatus is described. The method includes: receiving, by a terminal device, a first downlink signal from a network device in a first time unit of a first carrier, where the first carrier is a TDD carrier; determining, based on the first time unit, a second time unit used to send first feedback information for the first downlink signal on a second carrier, where the second carrier is an FDD uplink carrier; and sending the first feedback information to the network device on the second last symbol and/or the last symbol of the second time unit of (Continued)

the second carrier. Feedback information for a downlink signal on the first carrier is sent on the second carrier, so that a requirement of sending an uplink signal on the first carrier by the terminal device is reduced, thereby improving data transmission efficiency.

18 Claims, 9 Drawing Sheets

(51) Int. Cl.
  *H04L 5/00* (2006.01)
  *H04L 5/14* (2006.01)
  *H04L 27/26* (2006.01)
  *H04W 72/04* (2009.01)

(52) U.S. Cl.
  CPC ..... *H04L 27/2607* (2013.01); *H04W 72/0446* (2013.01); *H04W 72/0453* (2013.01); *H04W 76/15* (2018.02)

(56) References Cited

U.S. PATENT DOCUMENTS

| | | | |
|---|---|---|---|
| 2015/0043394 | A1 | 2/2015 | Lin et al. |
| 2015/0117272 | A1 | 4/2015 | Gao et al. |
| 2015/0333871 | A1 | 11/2015 | Lin et al. |
| 2016/0007310 | A1* | 1/2016 | Yi ..................... H04W 56/001 370/338 |
| 2016/0021655 | A1 | 1/2016 | Seo et al. |
| 2016/0242125 | A1* | 8/2016 | Lee ..................... H04W 52/248 |
| 2017/0026164 | A1 | 1/2017 | Damnjanovic et al. |
| 2018/0145818 | A1* | 5/2018 | Choi ..................... H04L 5/0051 |
| 2019/0014576 | A1* | 1/2019 | Liao ..................... H04L 5/0092 |
| 2019/0109692 | A1* | 4/2019 | Gao ..................... H04W 72/042 |
| 2019/0357157 | A1* | 11/2019 | Sandgren ..................... H04W 72/0446 |

FOREIGN PATENT DOCUMENTS

| | | |
|---|---|---|
| CN | 103384188 A | 11/2013 |
| CN | 103905165 A | 7/2014 |
| CN | 104349475 A | 2/2015 |
| CN | 104579589 A | 4/2015 |
| CN | 104811280 A | 7/2015 |
| CN | 106165481 A | 11/2016 |
| CN | 2017106702323.1 | 6/2022 |
| WO | 2013125860 A1 | 8/2013 |

OTHER PUBLICATIONS

"HARQ feedback and PUCCH design for TDD-FDD CA," 3GPP TSG RAN WG1 Meeting #75, San Francisco, USA, R1-135649, XP050735306, pp. 1-4, 3rd Generation Partnership Project, Valbonne, France (Nov. 11-15, 2013).

Ericsson, "Power Sharing for LTE-NR Dual connectivity," 3GPP TSG-RAN WG1 NR Ad-hoc#2, Qingdao, China, R1-1711526, total 3 pages, 3rd Generation Partnership Project, Valbonne, France (Jun. 27-30, 2017).

China Telecom, "Discussion on Uplink TDM Operation for NR NSA," 3GPP TSG-RAN WG1 NR AdHoc, Qingdao, China, R1-1710840, total 5 pages, 3rd Generation Partnership Project, Valbonne, France (Jun. 27-29, 2017).

* cited by examiner

SIGNAL SENDING AND RECEIVING METHOD, AND APPARATUS

CROSS-REFERENCE TO RELATED APPLICATIONS

This application is a continuation of International Application No. PCT/CN2018/092452, filed on Jun. 22, 2018, which claims priority to Chinese Patent Application No. 201710482203.2, filed on Jun. 22, 2017 and Chinese Patent Application No. 201710670232.1, filed on Aug. 8, 2017. The disclosures of the aforementioned applications are hereby incorporated by reference in their entireties.

TECHNICAL FIELD

This application relates to communications technologies, and in particular, to a signal sending and receiving method and an apparatus.

BACKGROUND

In a development and evolution process of wireless communications systems, both a 5th generation (5-Generation, 5G) new radio (New radio interface, NR) system and a long term evolution (LTE) system may be deployed on a frequency band lower than 6 GHz. A typical deployment manner is that the NR system is deployed at a frequency of 3.5 GHz and the LTE system is deployed at a frequency of 1.8 GHz. A terminal device may support dual connectivity (DC) communication. To be specific, the terminal device may work in both the LTE system and the NR system. The terminal device uses time division duplex (TDD) at the frequency of 3.5 GHz, and the terminal device uses frequency division duplex (FDD) at the frequency of 1.8 GHz.

In the foregoing deployment scenario, when the terminal device simultaneously sends uplink signals at the frequency of 3.5 GHz and the frequency of 1.8 GHz, because there is cross-modulation interference between the signals at the frequency of 3.5 GHz and the frequency of 1.8 GHz, performance of receiving a downlink signal of the LTE system by the terminal device at the frequency of 1.8 GHz is severely affected. To avoid this problem, an existing standard specifies the following: For a terminal device working in a dual connectivity mode, that is, working in both the LTE system and the NR system, the terminal device supports sending an uplink signal at only one frequency at a same time point. To be specific, when the terminal device sends an uplink signal at the frequency of 3.5 GHz, the terminal device does not send an uplink signal at the frequency of 1.8 GHz, and vice versa.

Considering that the NR system works in a TDD mode at the frequency of 3.5 GHz, each uplink subframe/slot needs to be used by the terminal device to feed back an acknowledgement (ACK)/negative acknowledgement (NACK) for a received downlink signal to a network device. In this case, because the terminal device supports sending an uplink signal at only one frequency, the terminal cannot send a signal in an uplink subframe/slot that is of the LTE system and that overlaps an uplink slot of the NR system in terms of time. This reduces uplink performance of the LTE system. In addition, because the terminal device may need to send an ACK/NACK for a downlink signal of the LTE system in these subframes, if the terminal device cannot send a signal in these subframes, the terminal device cannot perform feedback on the downlink signal received in a downlink subframe corresponding to the ACK/NACK. This also reduces downlink performance of the LTE system.

SUMMARY

This application provides a signal sending and receiving method and an apparatus, to improve data transmission efficiency when a terminal device transmits information by using two carriers.

A first aspect of this application provides a signal sending and receiving method, including:

receiving, by a terminal device, a first downlink signal from a network device in a first time unit of a first carrier, where the first carrier is a time division duplex TDD carrier, and the first time unit includes a first slot or a first subframe;

determining, by the terminal device, a second time unit used to send first feedback information for the first downlink signal on a second carrier, where the second carrier is a frequency division duplex FDD uplink carrier, and the second time unit includes a second slot or a second subframe; and sending, by the terminal device, the first feedback information to the network device on the second last symbol and/or the last symbol of the second time unit of the second carrier.

Optionally, the determining, by the terminal device, a second time unit used to send feedback information for the downlink signal on a second carrier includes:

determining, by the terminal device, the second time unit based on a correspondence between a time unit for receiving a downlink signal on the first carrier and a time unit that is of the second carrier and that is for sending feedback information for the downlink signal on the first carrier, where the correspondence is determined based on an uplink and downlink transmission direction configuration of the first carrier.

Optionally, a periodicity of the uplink and downlink transmission direction configuration of the first carrier is 2.5 milliseconds, the periodicity of the uplink and downlink transmission direction configuration includes five slots, the third slot in the periodicity of the uplink and downlink transmission direction configuration is an uplink slot, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the uplink and downlink transmission direction configuration of the first carrier is 5 milliseconds, the periodicity of the uplink and downlink transmission direction configuration includes 10 slots, the fifth slot and the sixth slot in the periodicity of the uplink and downlink transmission direction configuration are uplink slots, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Optionally, the method further includes: when the second time unit overlaps a first uplink slot of the first carrier in terms of time, determining, by the terminal device, not to send a signal on the last m symbols of the first uplink slot, where a value of m is 1 or 2.

Optionally, when a previous slot adjacent to the first uplink slot in terms of time is a first downlink slot, the terminal device determines not to receive a signal on the last m symbols of the first downlink slot, or the terminal device determines not to send a signal on the first m symbols of the first uplink slot, where the value of m includes 1 or 2, and the last m symbols of the first downlink slot or the first m symbols of the first uplink slot are a guard period GP.

Optionally, the sending, by the terminal device, the first feedback information to the network device on the second last symbol and/or the last symbol of the second time unit of the second carrier includes:

sending, by the terminal device, the first feedback information on the last symbol of the second time unit by using a subcarrier spacing of 15 KHz; or sending, by the terminal device, the first feedback information on the second last symbol and/or the last symbol of the second time unit by using a subcarrier spacing of 30 KHz.

Optionally, the first carrier is a carrier used in a first radio access technology, the second carrier is a carrier used in a second radio access technology, and the terminal device performs dual connectivity DC communication by using the first radio access technology and the second radio access technology.

Optionally, a subcarrier spacing used in the first radio access technology is greater than a subcarrier spacing used in the second radio access technology.

A second aspect of this application provides a terminal device, including:

a receiving module, configured to receive a first downlink signal from a network device in a first time unit of a first carrier, where the first carrier is a time division duplex TDD carrier, and the first time unit includes a first slot or a first subframe;

a determining module, configured to determine a second time unit used to send first feedback information for the first downlink signal on a second carrier, where the second carrier is a frequency division duplex FDD uplink carrier, and the second time unit includes a second slot or a second subframe; and a sending module, configured to send the first feedback information to the network device on the second last symbol and/or the last symbol of the second time unit of the second carrier.

Optionally, the determining module is specifically configured to determine the second time unit based on a correspondence between a time unit for receiving a downlink signal on the first carrier and a time unit that is of the second carrier and that is for sending feedback information for the downlink signal on the first carrier, where the correspondence is determined based on an uplink and downlink transmission direction configuration of the first carrier.

Optionally, a periodicity of the uplink and downlink transmission direction configuration of the first carrier is 2.5 milliseconds, the periodicity of the uplink and downlink transmission direction configuration includes five slots, the third slot in the periodicity of the uplink and downlink transmission direction configuration is an uplink slot, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the uplink and downlink transmission direction configuration of the first carrier is 5 milliseconds, the periodicity of the uplink and downlink transmission direction configuration includes 10 slots, the fifth slot and the sixth slot in the periodicity of the uplink and downlink transmission direction configuration are uplink slots, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Optionally, the determining module is further configured to: when the second time unit overlaps a first uplink slot of the first carrier in terms of time, determine not to send a signal on the last m symbols of the first uplink slot, where a value of m is 1 or 2.

Optionally, the determining module is further configured to: when a previous slot adjacent to the first uplink slot in terms of time is a first downlink slot, determine not to receive a signal on the last m symbols of the first downlink slot, or determine not to send a signal on the first m symbols of the first uplink slot, where the value of m includes 1 or 2, and the last m symbols of the first downlink slot or the first m symbols of the first uplink slot are a guard period GP.

Optionally, the sending module is specifically configured to: send the first feedback information on the last symbol of the second time unit by using a subcarrier spacing of 15 KHz, or send the first feedback information on the second last symbol and/or the last symbol of the second time unit by using a subcarrier spacing of 30 KHz.

Optionally, the first carrier is a carrier used in a first radio access technology, the second carrier is a carrier used in a second radio access technology, and the terminal device performs dual connectivity DC communication by using the first radio access technology and the second radio access technology.

Optionally, a subcarrier spacing used in the first radio access technology is greater than a subcarrier spacing used in the second radio access technology.

A third aspect of this application provides a terminal device. The terminal device includes a processor, a memory, a receiver, and a transmitter. The memory, the receiver, and the transmitter are connected to and communicate with the processor by using a bus. The memory is configured to store a computer executable instruction. The processor is configured to execute the computer executable instruction, so that the terminal device performs the method provided in the first aspect.

A fourth aspect of this application provides a signal sending and receiving method, including:

sending, by a network device, a first downlink signal to a terminal device in a first time unit of a first carrier, where the first carrier is a time division duplex TDD carrier, and the first time unit includes a first slot or a first subframe; and receiving, by the network device, first feedback information that is for the first downlink signal and that is sent by the terminal device on the second last symbol and/or the last symbol of a second time unit of a second carrier.

Optionally, the method further includes: sending, by the network device to the terminal device, a correspondence between a time unit for receiving a downlink signal on the first carrier and a time unit that is of the second carrier and that is for sending feedback information for the downlink signal on the first carrier, to determine the second time unit, where the correspondence is determined based on an uplink and downlink transmission direction configuration of the first carrier.

Optionally, a periodicity of the uplink and downlink transmission direction configuration of the first carrier is 2.5 milliseconds, the periodicity of the uplink and downlink transmission direction configuration includes five slots, the third slot in the periodicity of the uplink and downlink transmission direction configuration is an uplink slot, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the uplink and downlink transmission direction configuration of the first carrier is 5 milliseconds, the periodicity of the uplink and downlink transmission direction configuration includes 10 slots, the fifth slot and the sixth slot in the periodicity of the uplink and downlink transmission direction configuration are uplink slots, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Optionally, the first carrier is a carrier used in a first radio access technology, the second carrier is a carrier used in a second radio access technology, and the terminal device performs dual connectivity DC communication by using the first radio access technology and the second radio access technology.

Optionally, a subcarrier spacing used in the first radio access technology is greater than a subcarrier spacing used in the second radio access technology.

A fifth aspect of this application provides a network device, including:

a sending module, configured to send a first downlink signal to a terminal device in a first time unit of a first carrier, where the first carrier is a time division duplex TDD carrier, and the first time unit includes a first slot or a first subframe; and a receiving module, configured to receive first feedback information that is for the first downlink signal and that is sent by the terminal device on the second last symbol and/or the last symbol of a second time unit of a second carrier.

Optionally, the sending module is further configured to send, to the terminal device, a correspondence between a time unit for receiving a downlink signal on the first carrier and a time unit that is of the second carrier and that is for sending feedback information for the downlink signal on the first carrier, to determine the second time unit, where the correspondence is determined based on an uplink and downlink transmission direction configuration of the first carrier.

Optionally, a periodicity of the uplink and downlink transmission direction configuration of the first carrier is 2.5 milliseconds, the periodicity of the uplink and downlink transmission direction configuration includes five slots, the third slot in the periodicity of the uplink and downlink transmission direction configuration is an uplink slot, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the uplink and downlink transmission direction configuration of the first carrier is 5 milliseconds, the periodicity of the uplink and downlink transmission direction configuration includes 10 slots, the fifth slot and the sixth slot in the periodicity of the uplink and downlink transmission direction configuration are uplink slots, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Optionally, the first carrier is a carrier used in a first radio access technology, the second carrier is a carrier used in a second radio access technology, and the terminal device performs dual connectivity DC communication by using the first radio access technology and the second radio access technology.

Optionally, a subcarrier spacing used in the first radio access technology is greater than a subcarrier spacing used in the second radio access technology.

A sixth aspect of this application provides a network device. The network device includes a processor, a memory, a receiver, and a transmitter. The memory, the receiver, and the transmitter are connected to and communicate with the processor by using a bus. The memory is configured to store a computer executable instruction. The processor is configured to execute the computer executable instruction, so that the network device performs the method provided in the fourth aspect.

Another aspect of this application provides a communications system. The system includes the terminal device and the network device that are provided in the foregoing aspects.

Another aspect of this application provides a computer readable storage medium. The computer readable storage medium stores an instruction. When the instruction runs on a computer, the computer is enabled to perform the methods in the foregoing aspects.

Another aspect of this application provides a computer program product including an instruction. When the computer program product runs on a computer, the computer is enabled to perform the methods in the foregoing aspects.

According to the signal sending and receiving method and the apparatus provided in this application, the method includes: receiving, by the terminal device, the first downlink signal from the network device in the first time unit of the first carrier, where the first carrier is a TDD carrier; determining, based on the first time unit, the second time unit used to send the first feedback information for the first downlink signal on the second carrier, where the second carrier is an FDD uplink carrier; and sending the first feedback information to the network device on the second last symbol and/or the last symbol of the second time unit of the second carrier. The feedback information for the downlink signal on the first carrier is sent on the second carrier, so that a requirement of sending an uplink signal on the first carrier by the terminal device is reduced, thereby improving data transmission efficiency.

DESCRIPTION OF EMBODIMENTS

This application provides a signal sending and receiving method. The signal sending and receiving method may be applied to a carrier aggregation (CA) scenario and a dual connectivity (DC) scenario. The DC scenario includes the following two cases: A terminal device accesses two different network devices by using a same radio access technology, and a terminal device accesses one or two network devices by using two different radio access technologies. Certainly, the method may also be applied to another scenario. This is not limited herein.

In a typical DC scenario, a terminal device may access both a new radio (New radio interface, NR) system and a long term evolution (LTE) system. The NR system is also referred to as a 5th generation (5-Generation, 5G) mobile communications system. The terminal device establishes a connection to the NR system by using a first carrier, and establishes a connection to the LTE system by using a second carrier and a third carrier. The first carrier is a time division duplex (TDD) carrier, and a frequency of the first carrier is, for example, 3.5 GHZ. The second carrier is a frequency division duplex (FDD) uplink carrier, the third carrier is an FDD downlink carrier, a frequency of the second carrier is, for example, 1.75 GHz, and a frequency of the third carrier is, for example, 1.85 GHz. Herein, a duplex type of a carrier and a frequency of the carrier are merely examples for description. Duplex types and frequencies of the first carrier, the second carrier, and the third carrier are not limited thereto.

Figure 1:
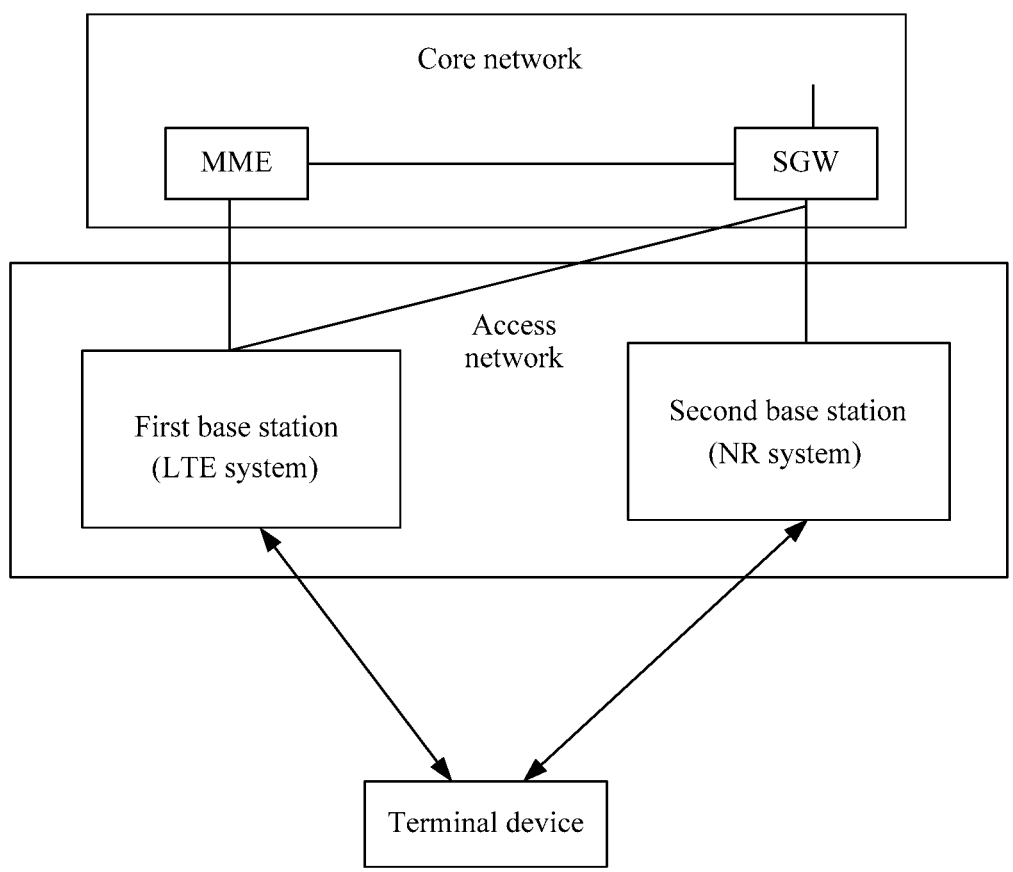
FIG. 1 is a schematic diagram of a DC scenario.

FIG. 1 is a schematic diagram of a DC scenario. As shown in FIG. 1, the DC scenario includes a core network, an access network, and a terminal device. Network elements in the core network include a mobility management entity (MME) and a serving gateway (SGW). Network elements in the access network include a first base station and a second base station. The first base station is an evolved NodeB (eNB) in an LTE system, and the second base station is a gNodeB in an NR system. In the scenario shown in FIG. 1, the NR system and the LTE system share one core network. Certainly, in another scenario, the NR system and the LTE system may alternatively have respective independent core networks. In the DC scenario, the terminal device accesses two base stations: both the first base station and the second base station. The first base station or the second base station may offload, at a packet data convergence protocol (PDCP) layer, data sent in the core network.

In a CA scenario, a terminal device communicates with one base station by using one primary component carrier (PCC) and at least one secondary component carrier (SCC). The base station may be an eNB in an LTE system or a gNodeB in an NR system. The primary component carrier is also referred to as a primary carrier, and the secondary component carrier is referred to as a secondary carrier.

The terminal device mentioned in this application may be a wireless terminal. The wireless terminal may be a device that provides a user with voice and/or data connectivity, a handheld device with a wireless connection function, or another processing device connected to a wireless modem. The wireless terminal may communicate with at least one core network through a radio access network (RAN). The wireless terminal may be a mobile terminal, for example, a mobile phone (or referred to as a "cellular" phone) and a computer that has a mobile terminal. For example, the wireless terminal may be a portable, pocket-size, handheld, computer built-in, or in-vehicle mobile apparatus that exchanges voice and/or data with the radio access network. The wireless terminal may also be referred to as a subscriber unit, a subscriber station, a mobile station, a mobile console, a remote station, an access point, a remote terminal, an access terminal, a user terminal, user equipment (UE), or a user agent. This is not limited herein.

Figure 2:
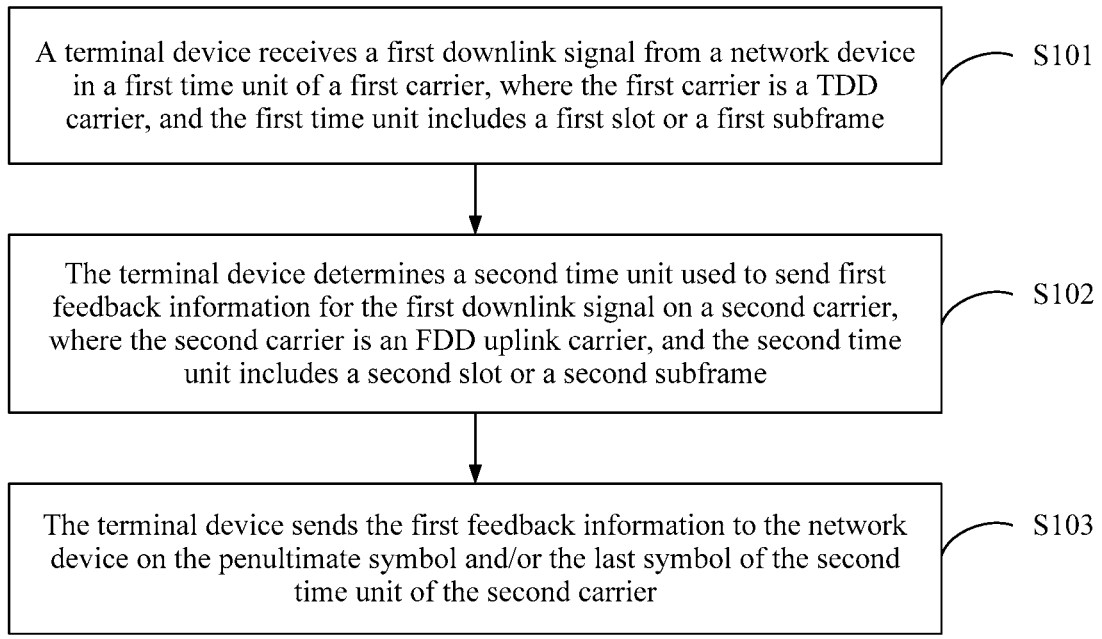
FIG. 2 is a flowchart of a signal sending and receiving method according to Embodiment 1.

FIG. 2 is a flowchart of a signal sending and receiving method according to Embodiment 1. As shown in FIG. 1, the method provided in this embodiment includes the following steps.

Step S101: A terminal device receives a first downlink signal from a network device in a first time unit of a first carrier, where the first carrier is a TDD carrier, and the first time unit includes a first slot or a first subframe.

Step S102: The terminal device determines a second time unit used to send first feedback information for the first downlink signal on a second carrier, where the second carrier is an FDD uplink carrier, and the second time unit includes a second slot or a second subframe.

A DC scenario is used as an example for description in this embodiment. The first carrier is a carrier used in a first radio access technology, and the second carrier is a carrier used in a second radio access technology. The first radio access technology is, for example, an access technology used in an NR system, and the second radio access technology is, for example, a radio access technology used in an LTE system.

Figure 3:
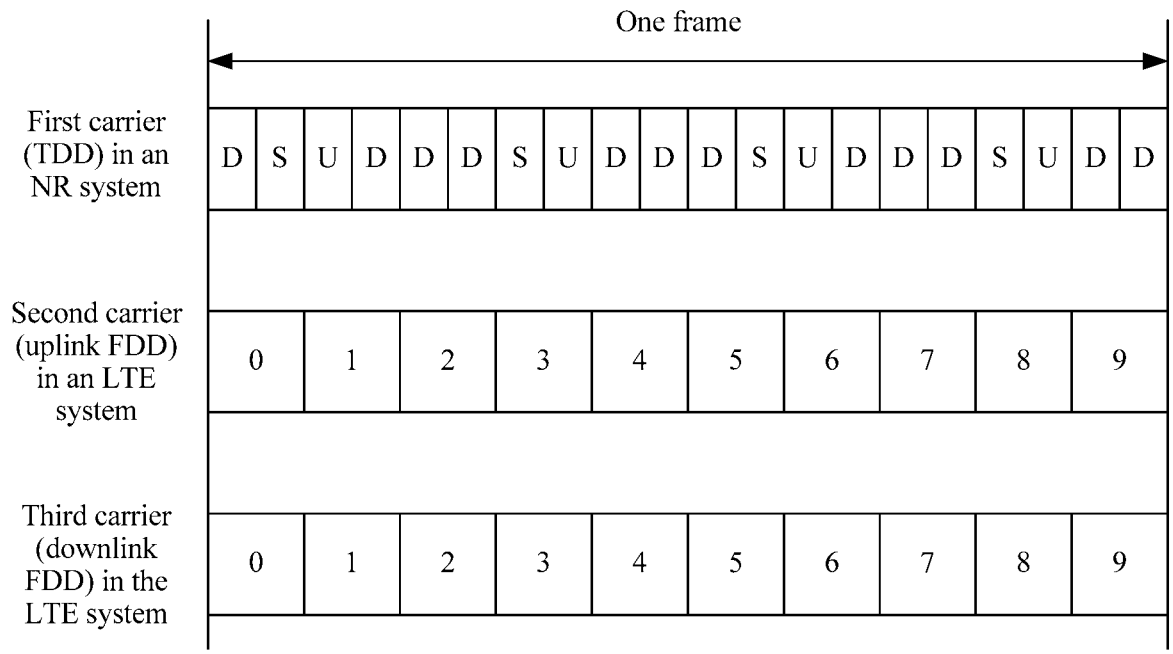
FIG. 3 is a schematic diagram of frame structures in an NR system and an LTE system.

FIG. 3 is a schematic diagram of frame structures in an NR system and an LTE system. As shown in FIG. 3, in the LTE system, one radio frame includes 10 subframes numbered from 0 to 9. In addition, one subframe includes two slots (Slot). Therefore, in the LTE system, one radio frame includes 20 slots numbered from 0 to 19. In the NR system, one radio frame is 10 ms, one radio frame includes 10 subframes, and one subframe is 1 ms. A quantity of slots included in one subframe is related to a value of a subcarrier spacing (SCS). When the subcarrier spacing is 15 KHZ, one subframe includes one or two slots. When the subcarrier spacing is 30 KHZ, one subframe includes two or four slots. Certainly, the subcarrier spacing in the NR system is not limited to 15 KHZ and 30 KHZ. In an example in FIG. 3, it should be understood that when the subcarrier spacing is 30 KHZ, one subframe includes two slots, or when the subcarrier spacing is 15 KHZ, one subframe includes one slot. Therefore, in the example in FIG. 3, one radio frame in NR includes 20 slots whose slot numbers are 0 to 19. D represents a downlink slot, U represents an uplink slot, and S represents a special slot. The special slot may be understood as a slot different from D and U. For example, the special slot may be understood as a slot that can be used for both uplink transmission and downlink transmission. This is not limited herein. Certainly, a quantity of slots included in one radio frame in NR is not limited to 20, and a type of each slot is not limited to that in FIG. 3.

Referring to FIG. 3, in the prior art, feedback information for a downlink signal on the first carrier can be fed back only in an uplink subframe of the first carrier, and feedback information for a downlink signal on a third carrier can be fed back only on the second carrier. The feedback information for the downlink signal is an ACK message or a NACK message. Because the terminal device supports sending an uplink signal on only one carrier or at only one frequency, the terminal cannot send a signal in an uplink subframe/slot that is of the second carrier and that overlaps an uplink slot of the first carrier in terms of time. This reduces uplink performance of the LTE system. In addition, because the terminal device may need to send an ACK/NACK for a downlink signal of the LTE system in these subframes, if the terminal device cannot send a signal in these subframes, the terminal device cannot perform feedback on the downlink signal received in a downlink subframe corresponding to the ACK/NACK. This also reduces downlink performance of the LTE system. Certainly, the terminal may alternatively choose to send a signal on the second carrier instead of the first carrier. In this case, uplink performance of the NR system is reduced.

To resolve the problem in the prior art, in this embodiment, the terminal device sends, by using the second carrier, the feedback information for the downlink signal received on the first carrier. Therefore, after receiving the first downlink signal in the first time unit of the first carrier, the terminal device needs to determine the second time unit used to send the first feedback information for the first downlink signal on the second carrier.

In an implementation, the terminal device determines the second time unit based on a correspondence between a time unit for receiving a downlink signal on the first carrier and a time unit that is of the second carrier and that is for sending feedback information for the downlink signal on the first carrier. The correspondence is determined based on an uplink and downlink transmission direction configuration of the first carrier. It should be understood that the uplink and downlink transmission direction configuration may include a transmission direction in one or more radio frames, may include a transmission direction in one or more subframes, slots, mini-slots, OFDM symbols, or DFT-S-OFDM symbols, or may certainly include a transmission direction in another time length. This is not limited herein. The transmission direction includes an uplink direction, a downlink direction, or a guard period. To be specific, the guard period means that no signal is sent or received. The correspondence may be preconfigured in the terminal device, or may be notified by a network side device to the terminal device by using higher layer signaling. For example, the higher layer signaling is radio resource control (RRC) layer signaling. Alternatively, a plurality of correspondences may be preconfigured in the terminal device, and a network side device notifies the terminal device of a specific to-be-used correspondence in the plurality of correspondences by using signaling.

In another implementation, indication information of the second time unit is carried in downlink control information (DCI) that is sent by a network side device to the terminal device by using a physical downlink control channel (PDCCH).

A periodicity of the uplink and downlink transmission direction configuration of the first carrier may be 2.5 ms, 5 ms, or 10 ms. A periodicity of 2.5 ms includes five slots. A periodicity of 5 ms includes 10 slots. A periodicity of 10 ms includes 20 slots. The uplink and downlink transmission direction configuration of the first carrier is not limited in this embodiment. An uplink and downlink transmission direction configuration of 2.5 ms is, for example, "DSUDD" or "DDUDD". An uplink and downlink transmission direction configuration of 5 ms is, for example, "DDDD-UUDDDD".

Figure 4:
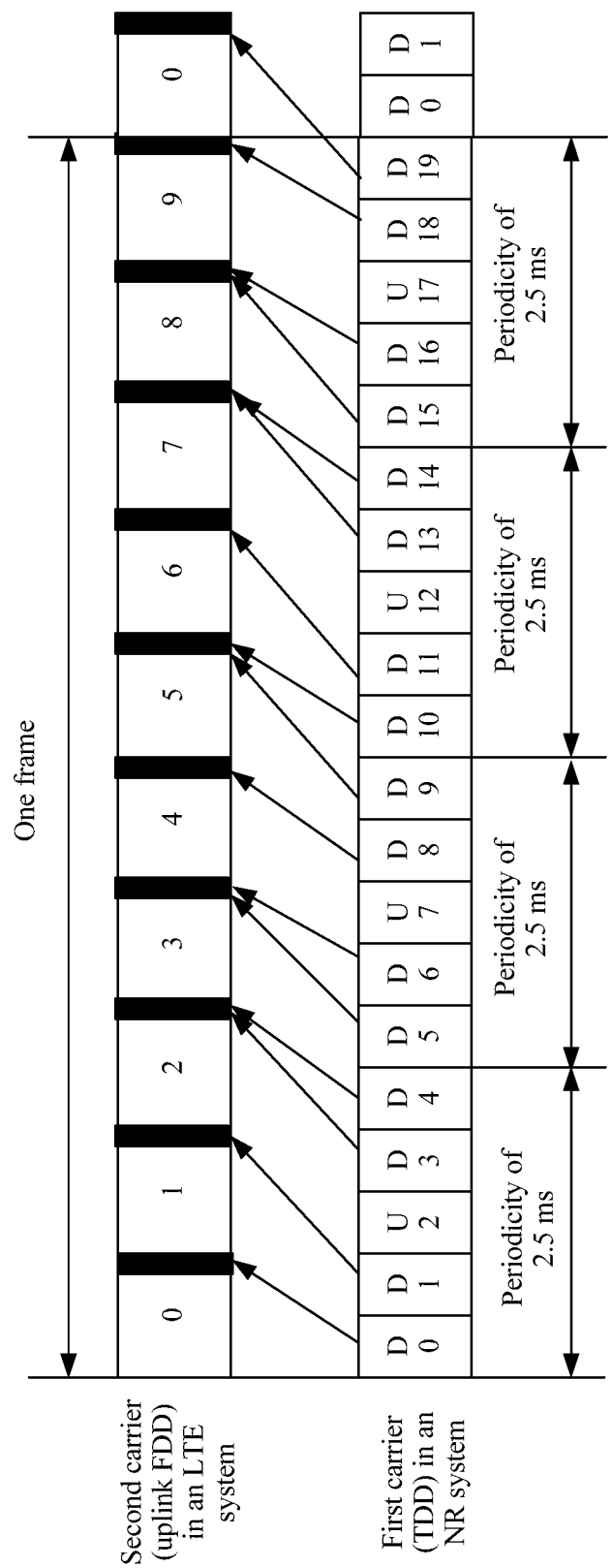
FIG. 4 is a schematic diagram of a correspondence between a time unit for receiving a downlink signal on a first carrier and a time unit that is of a second carrier and that is for sending feedback information for the downlink signal on the first carrier.

The correspondence is obtained based on the uplink and downlink transmission direction configuration of the first carrier. In an example in which a subcarrier spacing of 30 KHz is used for the first carrier, a subcarrier spacing of 15 KHz is used for the second carrier, and the periodicity of the uplink and downlink transmission direction configuration is 2.5 ms, the periodicity of the uplink and downlink transmission direction configuration includes five slots, and the uplink and downlink transmission direction configuration of five slots is, for example, DDUDD. In other words, the third slot in the periodicity of the uplink and downlink transmission direction configuration is an uplink slot, and remaining slots are downlink slots. FIG. 4 is a schematic diagram of a correspondence between a time unit for receiving a downlink signal on a first carrier and a time unit that is of a second carrier and that is for sending feedback information for the downlink signal on the first carrier. In FIG. 4, a start end of an arrow represents the time unit for receiving the downlink signal on the first carrier, and a pointing end of the arrow is the time unit that is of the second carrier and that is for sending the feedback information for the downlink signal on the first carrier. Specifically, feedback information is sent on the last two symbols of each subframe of the second carrier, and the last two symbols of each subframe of the second carrier belong to the latter slot of each subframe. Therefore, in other words, the feedback information is sent on the last two symbols of the second slot of each subframe. The symbols for sending the feedback information are at a location shown by a black rectangular block on the second carrier in FIG. 4.

Referring to FIG. 4, the correspondence may be represented as (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Figure 5:
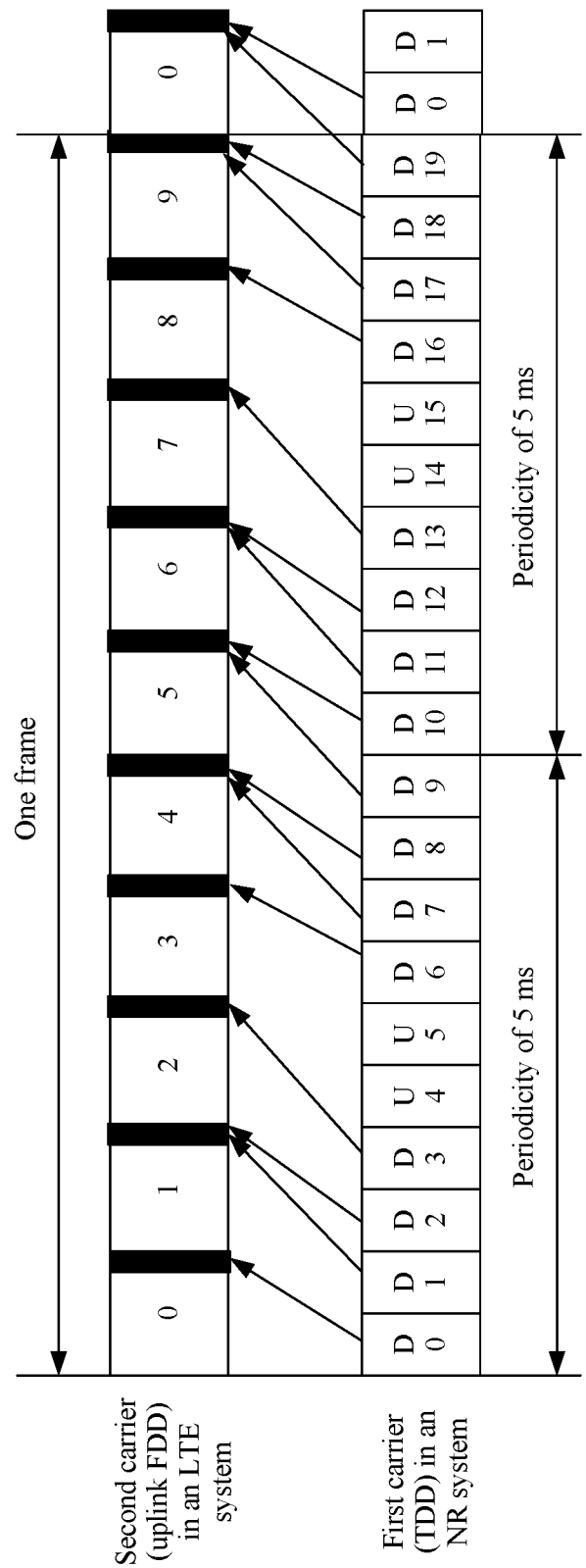
FIG. 5 is another schematic diagram of a correspondence between a time unit for receiving a downlink signal on a first carrier and a time unit that is of a second carrier and that is for sending feedback information for the downlink signal on the first carrier.

In an example in which a subcarrier spacing of 30 KHz is used for the first carrier, a subcarrier spacing of 15 KHz is used for the second carrier, and the periodicity of the uplink and downlink transmission direction configuration of the first carrier is 5 milliseconds, the periodicity of the uplink and downlink transmission direction configuration includes 10 slots, and the uplink and downlink transmission direction configuration of 10 slots is, for example, DDDDUUDDDD. In other words, the fifth slot and the sixth slot in the periodicity of the uplink and downlink transmission direction configuration are uplink slots, and remaining slots are downlink slots. FIG. 5 is another schematic diagram of a correspondence between a time unit for receiving a downlink signal on a first carrier and a time unit that is of a second carrier and that is for sending feedback information for the downlink signal on the first carrier. In FIG. 5, a start end of an arrow represents the time unit for receiving the downlink signal on the first carrier, and a pointing end of the arrow is the time unit that is of the second carrier and that is for sending the feedback information for the downlink signal on the first carrier. Specifically, feedback information is sent on the last two symbols of each subframe of the second carrier, and the last two symbols of each subframe of the second carrier belong to the latter slot of each subframe. Therefore, in other words, the feedback information is sent on the last two symbols of the second slot of each subframe. The symbols for sending the feedback information are at a location shown by a black rectangular block on the second carrier in FIG. 5.

Referring to FIG. 5, the correspondence may be represented as (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

The terminal device may determine the second time unit based on the foregoing correspondence and a number of the first time unit. For example, when the first time unit is numbered as a slot 3 of the first carrier, based on the correspondence, the terminal device determines that the second time unit is the second slot of a subframe 2 of the second carrier, or determines that the second time unit is a slot 5 of the second carrier. For (19, 0, 1), it should be understood that when the first time unit is a slot that is numbered 19 and that is of the first carrier, the second time unit is the second slot of a subframe 0 of a next radio frame of the second carrier.

It should be noted that the foregoing two correspondences are merely examples for description. When the uplink and downlink transmission direction configuration changes, the correspondences also correspondingly change. Alternatively, when one or more subframes of the second carrier cannot be used by the terminal device to send the feedback information for the downlink signal on the first carrier, the correspondences correspondingly change, to be specific, values of Y and/or Z corresponding to one or more Xs change.

Figure 6:
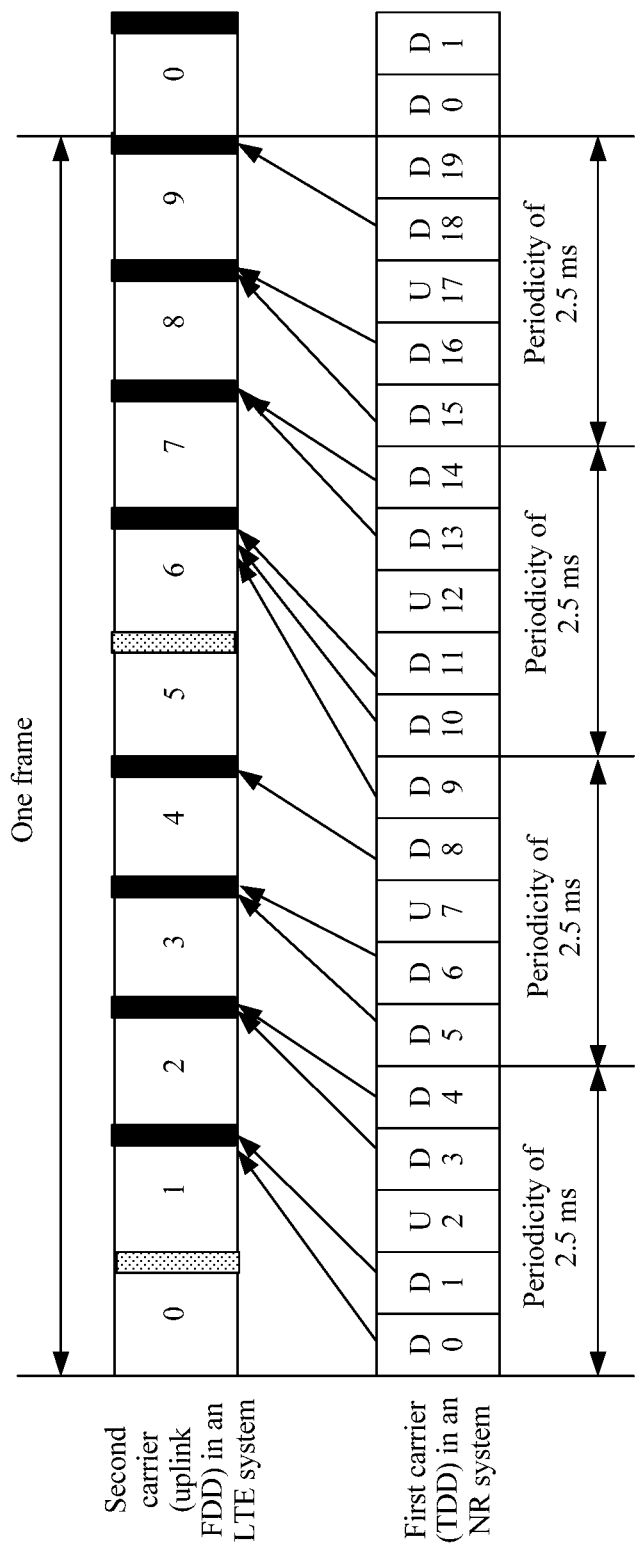
FIG. 6 is still another schematic diagram of a correspondence between a time unit for receiving a downlink signal on a first carrier and a time unit that is of a second carrier and that is for sending feedback information for the downlink signal on the first carrier.

For example, in the example shown in FIG. 4, if the terminal device cannot send feedback information for the first carrier in a subframe 0 and a subframe 5 of the second carrier, feedback information for a downlink signal received by the terminal device in a slot 0 of the first carrier cannot be sent in the subframe 0 of the second carrier, and feedback information for downlink signals received by the terminal device in a slot 9 and a slot 10 of the first carrier cannot be sent in the subframe 5 of the second carrier. For example, the terminal device may send the feedback information in next available time units of the subframe 0 and the subframe 5 of the second carrier. To be specific, the terminal device may send, in a subframe 1 of the second carrier, the feedback information for the downlink signal in the slot 0 of the first carrier, and send, in a subframe 6 of the second carrier, the feedback information for the downlink signals in the slot 9 and the slot 10 of the first carrier, so as to obtain a correspondence shown in FIG. 6. As shown in FIG. 6, in this case, a value of the correspondence (X, Y, Z) includes at least one of (0, 1, 3), (1, 1, 3), (3, 2, 5), (4, 2, 5), (5, 3, 7), (6, 3, 7), (8, 4, 9), (9, 6, 13), (10, 6, 13), (11, 6, 13), (13, 7, 15), (14, 7, 15), (15, 8, 17), (16, 8, 17), (18, 9, 19), and (19, 0, 1).

Figure 7:
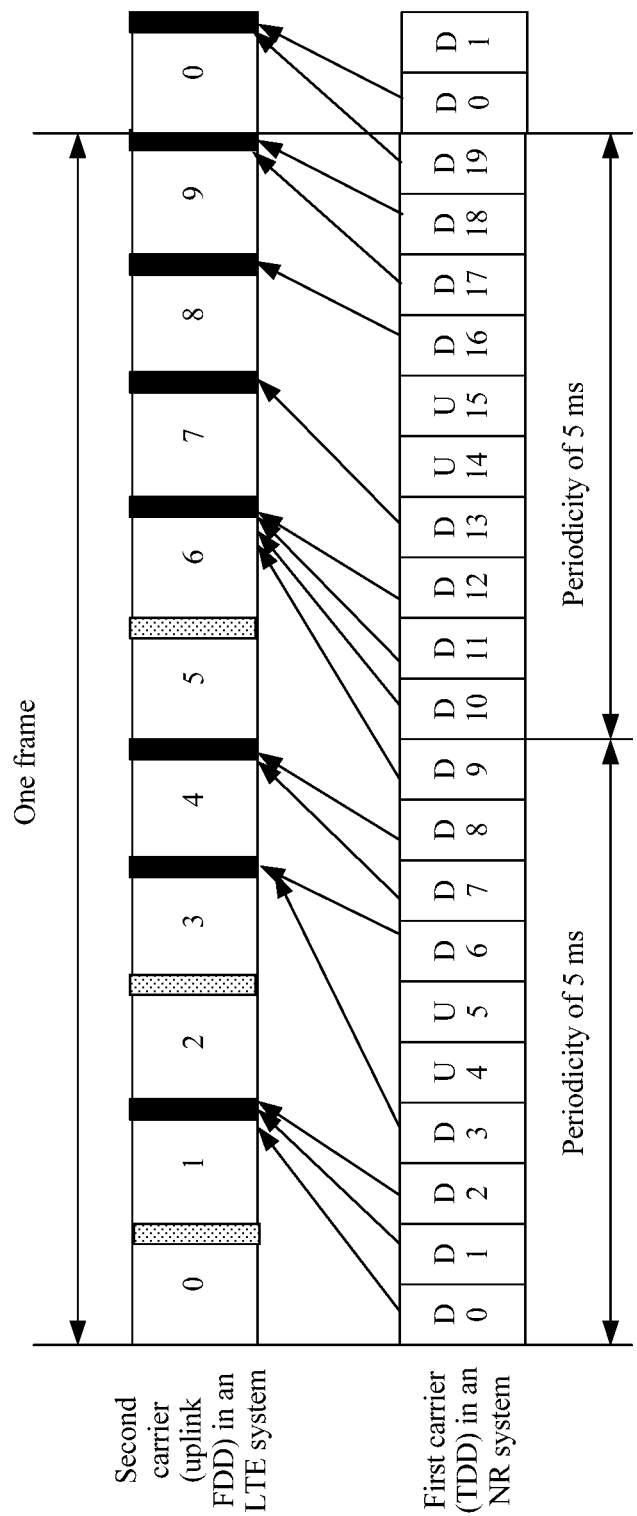
FIG. 7 is yet another schematic diagram of a correspondence between a time unit for receiving a downlink signal on a first carrier and a time unit that is of a second carrier and that is for sending feedback information for the downlink signal on the first carrier.

For another example, in the example shown in FIG. 5, if the terminal device cannot send feedback information for the first carrier in a subframe 0, a subframe 2, and a subframe 5 of the second carrier, feedback information for a downlink signal received by the terminal device in a slot 0 of the first carrier cannot be sent in the subframe 0 of the second carrier, feedback information for a downlink signal received by the terminal device in a slot 3 of the first carrier cannot be sent in the subframe 2 of the second carrier, and feedback information for downlink signals received by the terminal device in a slot 9 and a slot 10 cannot be sent in the subframe 5 of the second carrier. For example, the terminal device may send the feedback information in next available time units of the subframe 0, the subframe 2, and the subframe 5. To be specific, the terminal device may send, in a subframe 1 of the second carrier, the feedback information for the downlink signal in the slot 0 of the first carrier; send, in a subframe 3 of the second carrier, the feedback information for the downlink signal in the slot 3 of the first carrier; and send, in a subframe 6 of the second carrier, the feedback information for the downlink signals in the slot 9 and the slot 10 of the first carrier, so as to obtain a correspondence shown in FIG. 7. As shown in FIG. 7, a value of the correspondence (X, Y, Z) includes at least one of (0, 1, 3), (1, 1, 3), (2, 1, 3), (3, 3, 7), (6, 3, 7), (7, 4, 9), (8, 4, 9), (9, 6, 13), (10, 6, 13), (11, 6, 13), (12, 6, 13), (13, 7, 15), (16, 8, 17), (17, 9, 19), (18, 9, 19), and (19, 0, 1).

Optionally, the terminal device may obtain a plurality of different correspondences. When a subframe or some subframes of the second carrier cannot be used by the terminal device to send the feedback information for the downlink signal on the first carrier, the terminal device traverses another correspondence, to find an available correspondence, and determine, based on the available correspondence, a time unit for sending the feedback information on the second carrier. Alternatively, the terminal device stores only one correspondence. When a subframe or some subframes of the second carrier cannot be used by the terminal device to send the feedback information for the downlink signal on the first carrier, the terminal device determines, according to a preset rule based on the correspondence, a time unit for sending the feedback information on the second carrier. The preset rule is, for example, that a next available time unit of the subframe that is of the second carrier and that cannot be used by the terminal device to send the feedback information for the downlink signal on the first carrier is used as the time unit for sending the feedback information.

It should be noted that a reason that one or more subframes of the second carrier cannot be used by the terminal device to send the feedback information for the downlink signal on the first carrier may be as follows: The terminal device needs to send a sounding reference signal (SRS) in the one or more subframes. The SRS may be a periodic SRS or an aperiodic SRS. In this case, a value of the correspondence (X, Y, Z) is related to an SRS configuration of the terminal device. When the SRS configuration of the terminal device changes, the value of the correspondence is correspondingly adjusted, to be specific, values of Y and/or Z corresponding to one or more Xs change. Certainly, there may be another reason that one or more subframes of the second carrier cannot be used by the terminal device to send the feedback information for the downlink signal on the first carrier. This is not limited herein.

In addition, a correspondence between the first time unit and the second time unit may be understood as a relationship in terms of physical time. For example, when the first time unit is the slot 0 of the first carrier, the determined second time unit is the subframe 0 of the second carrier or the second slot of the subframe 0. In this case, the subframe 0 should be understood as a subframe that overlaps the first time unit in terms of time. When a number of the subframe 0 changes, the value of (X, Y, Z) may change, but a location of the first time unit relative to the second time unit in terms of physical time remains unchanged.

Step S103: The terminal device sends the first feedback information to the network device on the second last symbol and/or the last symbol of the second time unit of the second carrier.

Specifically, the terminal device may send the first feedback information on the last symbol of the second time unit by using a subcarrier spacing of 15 KHz. Alternatively, the terminal device sends the first feedback information on the second last symbol and/or the last symbol of the second time unit by using a subcarrier spacing of 30 KHz. The symbol may be an orthogonal frequency division multiplexing (OFDM) symbol, may be a discrete Fourier transform-spread-OFDM (DFT-S-OFDM) symbol, or may certainly be a time length shorter than one OFDM symbol.

Optionally, in this embodiment, a subcarrier spacing of the first carrier is greater than a second subcarrier spacing. In an example in which the first carrier is a carrier in the NR system and the second carrier is a carrier in the LTE system, if a subcarrier spacing in the LTE system is 15 KHz, the spacing of the first subcarrier should be 30 KHz. Certainly, the subcarrier spacing of 15 KHz may be used in both the LTE system and the NR system, or a subcarrier spacing greater than 30 KHz may be used in the NR system, for example, a subcarrier spacing of 60 KHz.

Figure 8:
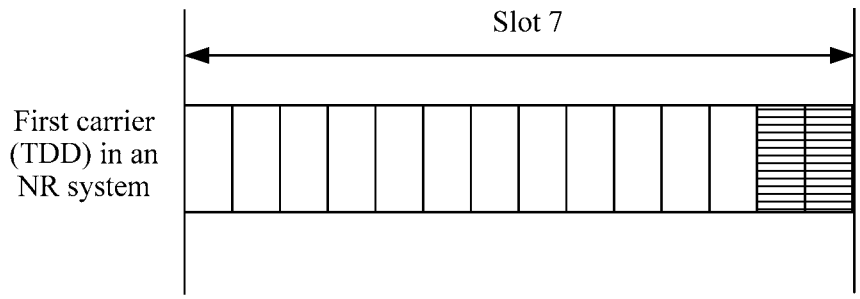
FIG. 8 is a schematic diagram of a frame structure of a slot 7 of a first carrier.

In this embodiment, the second time unit may or may not overlap a first uplink slot of the first carrier in terms of time. When the second time unit overlaps the first uplink slot of the first carrier in terms of time, the terminal device determines not to send a signal on the last m symbols of the first uplink slot. A value of m is 1 or 2, or may certainly be another value. For example, in the example shown in FIG. 4, the last two symbols of a subframe 3 of the second carrier overlap a slot 7 of the first carrier in terms of time. In this case, a frame structure of the slot 7 of the first carrier is shown in FIG. 8. The last two symbols of the slot 7 are discarded. That a symbol is discarded means that the symbol cannot be used to send or receive a signal. An objective of discarding the last two symbols of the slot 7 is that the terminal needs to send an ACK/NACK at a corresponding symbol location on the second carrier.

When a previous slot adjacent to the first uplink slot in terms of time is a first downlink slot, the terminal device determines not to receive a signal on the last m symbols of the first downlink slot, or the terminal device determines not to send a signal on the first m symbols of the first uplink slot. The value of m includes 1 or 2, and the last m symbols of the first downlink slot or the first m symbols of the first uplink slot may be understood as a guard period (GP). A downlink-to-uplink switch point of the first carrier is placed at a same location as that for sending the ACK/NACK on the second carrier, so as to avoid using an additional time domain resource for downlink-to-uplink switch, thereby improving resource utilization. For example, in the example shown in FIG. 4, the last two symbols of the subframe 3 of the second carrier overlap the slot 7 of the first carrier in terms of time, and a slot 6 is a downlink slot.

Figure 9:
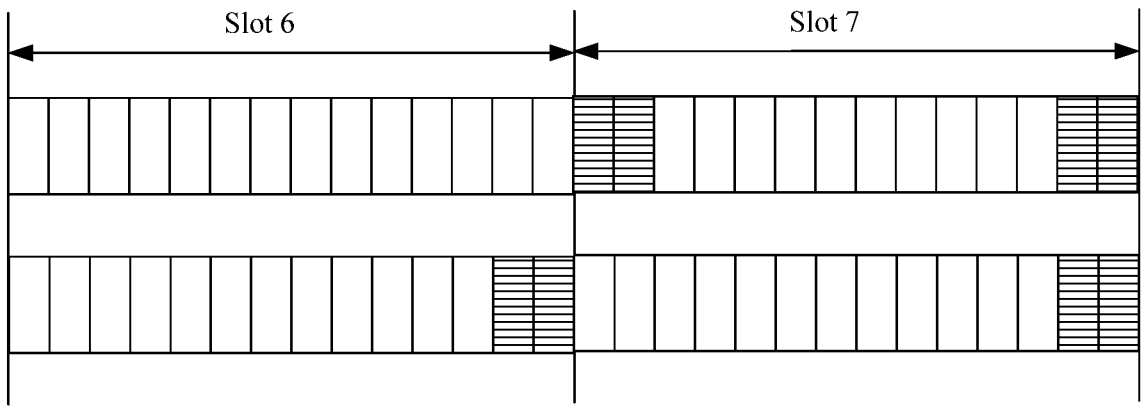
FIG. 9 is a schematic diagram of frame structures of a slot 6 and a slot 7 of a first carrier.

In this case, frame structures of the slot 6 and the slot 7 of the first carrier are shown in FIG. 9. The last two symbols of the slot 7 are discarded, and the first two symbols of the slot 7 or the last two symbols of the slot 6 are discarded. That a symbol is discarded should be understood as follows: No signal is sent or received on the symbol. Discarding the last two symbols of the slot 7 is to ensure that the terminal device can normally send the ACK/NACK at the corresponding symbol location on the second carrier. Discarding the last two symbols of the slot 6 or discarding the first two symbols of the slot 7 is to ensure that the network device can have sufficient time to complete switch from downlink sending to uplink receiving.

Figure 10:
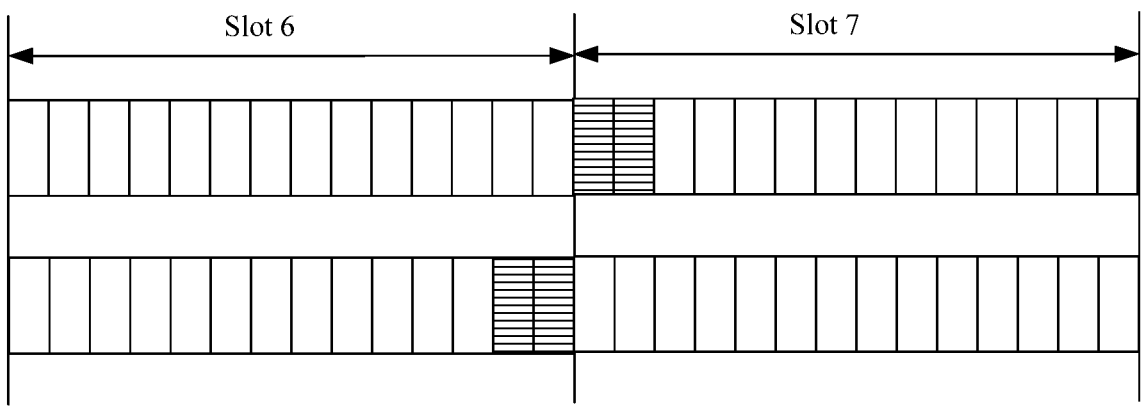
FIG. 10 is another schematic diagram of frame structures of a slot 1 and a slot 2 of a first carrier.

When the second time unit does not overlap a first uplink slot of the first carrier in terms of time, and a previous slot adjacent to the first uplink slot in terms of time is a first downlink slot, the terminal device determines not to receive a signal on the last m symbols of the first downlink slot, or the terminal device determines not to send a signal on the first m symbols of the first uplink slot. A value of m includes 1 or 2, or may certainly be another value, and the last m symbols of the first downlink slot or the first m symbols of the first uplink slot may be understood as a guard period. For example, in the example shown in FIG. 4, a slot 2 of the first carrier does not overlap the subframe 1 of the second carrier in terms of time, and the slot 2 is a downlink slot. In this case, frame structures of a slot 1 and the slot 2 of the first carrier are shown in FIG. 10. The last two symbols of the slot 1 are discarded, or the first two symbols of the slot 2 are discarded. That a symbol is discarded should be understood as follows: The symbol cannot be used to send or receive a signal. An objective of discarding the last two symbols of the slot 1 or discarding the first two symbols of the slot 2 is to leave time for the network device to switch from downlink sending to uplink receiving. Because the slot 2 does not overlap the subframe 1 of the second carrier in terms of time, the last two symbols of the slot 2 do not need to be discarded.

In this embodiment, the terminal device receives the first downlink signal from the network device in the first time unit of the first carrier, where the first carrier is a TDD carrier; determines, based on the first time unit, the second time unit used to send the first feedback information for the first downlink signal on the second carrier, where the second carrier is an FDD uplink carrier; and sends the first feedback information to the network device on the second last symbol and/or the last symbol of the second time unit of the second carrier. The feedback information for the downlink signal on the first carrier is sent on the second carrier, so that a requirement of sending an uplink signal on the first carrier by the terminal device is reduced, thereby avoiding a case in which the terminal device simultaneously sends uplink signals on the first carrier and the second carrier. In a scenario in which the terminal device performs DC communication with the NR system and the LTE system, a performance loss of the LTE system is greatly reduced.

Figure 11:
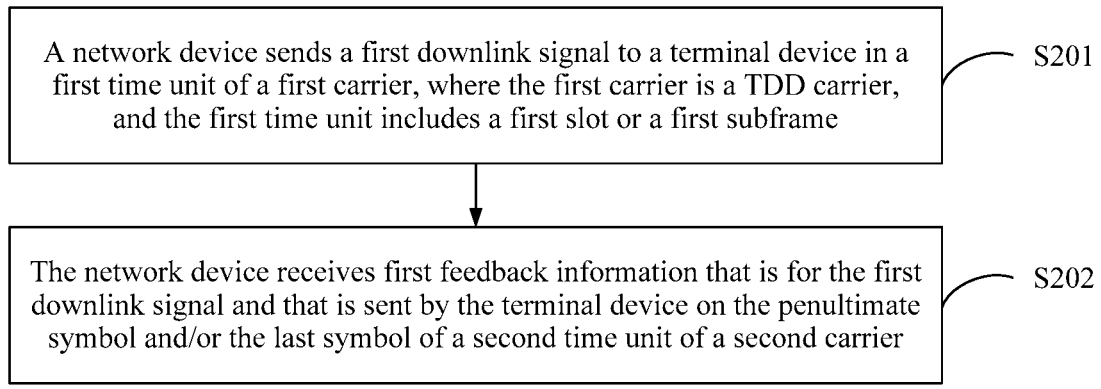
FIG. 11 is a flowchart of a signal sending and receiving method according to Embodiment 2.

FIG. 11 is a flowchart of a signal sending and receiving method according to Embodiment 2. As shown in FIG. 11, the method provided in this embodiment includes the following steps.

Step S201: A network device sends a first downlink signal to a terminal device in a first time unit of a first carrier, where the first carrier is a TDD carrier, and the first time unit includes a first slot or a first subframe.

Optionally, before step S201, the network device sends, to the terminal device, a correspondence between a time unit for receiving a downlink signal on the first carrier and a time unit that is of a second carrier and that is for sending feedback information for the downlink signal on the first carrier, to determine a second time unit. The correspondence is determined based on an uplink and downlink transmission direction configuration of the first carrier. The terminal device determines, based on the correspondence, the second time unit used to send first feedback information for the first downlink signal on the second carrier.

Optionally, a periodicity of the uplink and downlink transmission direction configuration of the first carrier is 2.5 milliseconds, the periodicity of the uplink and downlink transmission direction configuration includes five slots, the third slot in the periodicity of the uplink and downlink transmission direction configuration is an uplink slot, and remaining slots are downlink slots. Correspondingly, the correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the uplink and downlink transmission direction configuration of the first carrier is 5 milliseconds, the periodicity of the uplink and downlink transmission direction configuration includes 10 slots, the fifth slot and the sixth slot in the periodicity of the uplink and downlink transmission direction configuration are uplink slots, and remaining slots are downlink slots. Correspondingly, the correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Alternatively, a plurality of correspondences may be preconfigured in the terminal device, and before step S201, a network side device notifies the terminal device of a specific to-be-used correspondence in the plurality of correspondences by using signaling.

Alternatively, before step S201, the network device sends indication information of the second time unit to the terminal device, and the terminal device determines the second time unit based on the indication information.

Optionally, the first carrier is a carrier used in a first radio access technology, the second carrier is a carrier used in a second radio access technology, and the terminal device performs DC communication by using the first radio access technology and the second radio access technology. Optionally, a subcarrier spacing used in the first radio access technology is greater than a subcarrier spacing used in the second radio access technology. The first radio access technology may be an NR access technology, and the second access technology may be an LTE access technology.

Step S202: The network device receives the first feedback information that is for the first downlink signal and that is sent by the terminal device on the second last symbol and/or the last symbol of the second time unit of the second carrier.

In this embodiment, the network device sends the first downlink signal to the terminal device in the first time unit of the first carrier, where the first carrier is a TDD carrier, and the first time unit includes the first slot or the first subframe; and receives the first feedback information that is for the first downlink signal and that is sent by the terminal device on the second last symbol and/or the last symbol of the second time unit of the second carrier. The terminal device sends, on the second carrier, the feedback information for the downlink signal on the first carrier, so that a requirement of sending an uplink signal on the first carrier by the terminal device is reduced, thereby improving data transmission efficiency. When the method in this embodiment is applied to a scenario in which the terminal device performs DC communication with an NR system and an LTE system, a case in which the terminal device simultaneously sends uplink signals on the first carrier and the second carrier can be avoided, so that a performance loss of the LTE system is greatly reduced.

Figure 12:
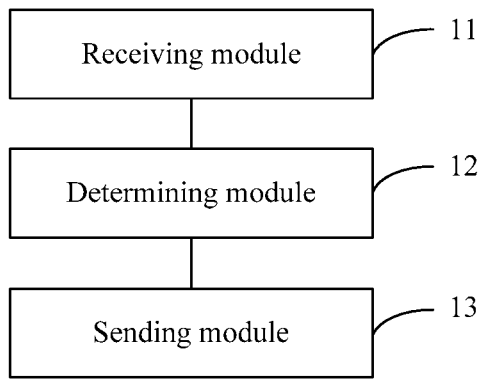
FIG. 12 is a schematic structural diagram of a terminal device according to Embodiment 3.

FIG. 12 is a schematic structural diagram of a terminal device according to Embodiment 3. As shown in FIG. 12, the terminal device provided in this embodiment includes a receiving module 11, a determining module 12, and a sending module 13.

The receiving module 11 is configured to receive a first downlink signal from a network device in a first time unit of a first carrier, where the first carrier is a time division duplex TDD carrier, and the first time unit includes a first slot or a first subframe.

The determining module 12 is configured to determine a second time unit used to send first feedback information for the first downlink signal on a second carrier, where the second carrier is a frequency division duplex FDD uplink carrier, and the second time unit includes a second slot or a second subframe.

The sending module 13 is configured to send the first feedback information to the network device on the second last symbol and/or the last symbol of the second time unit of the second carrier.

Optionally, the determining module 12 is specifically configured to determine the second time unit based on a correspondence between a time unit for receiving a downlink signal on the first carrier and a time unit that is of the second carrier and that is for sending feedback information for the downlink signal on the first carrier, where the correspondence is determined based on an uplink and downlink transmission direction configuration of the first carrier.

Optionally, a periodicity of the uplink and downlink transmission direction configuration of the first carrier is 2.5 milliseconds, the periodicity of the uplink and downlink transmission direction configuration includes five slots, the third slot in the periodicity of the uplink and downlink transmission direction configuration is an uplink slot, and remaining slots are downlink slots. Correspondingly, the correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the TDD configuration of the first carrier is 5 milliseconds, the periodicity of the TDD configuration includes 10 slots, the fifth slot and the sixth slot in the periodicity of the TDD configuration are uplink slots, and remaining slots are downlink slots. Correspondingly, the correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Optionally, the determining module 12 is further configured to: when the second time unit overlaps a first uplink slot of the first carrier in terms of time, determine not to send a signal on the last m symbols of the first uplink slot, where a value of m is 1 or 2.

Optionally, the determining module 12 is further configured to: when a previous slot adjacent to the first uplink slot in terms of time is a first downlink slot, determine not to receive a signal on the last m symbols of the first downlink slot, or determine not to send a signal on the first m symbols of the first uplink slot, where the value of m includes 1 or 2, and the last m symbols of the first downlink slot or the first m symbols of the first uplink slot are a guard period GP.

Optionally, the sending module 13 is specifically configured to: send the first feedback information on the last symbol of the second time unit by using a subcarrier spacing of 15 KHz, or send the first feedback information on the second last symbol and/or the last symbol of the second time unit by using a subcarrier spacing of 30 KHz.

Optionally, the first carrier is a carrier used in a first radio access technology, the second carrier is a carrier used in a second radio access technology, and the terminal device performs dual connectivity DC communication by using the first radio access technology and the second radio access technology.

Optionally, a subcarrier spacing used in the first radio access technology is greater than a subcarrier spacing used in the second radio access technology.

The terminal device in this embodiment may be configured to perform the method provided in Embodiment 2. Specific implementations and technical effects are similar, and details are not described herein again.

Figure 13:
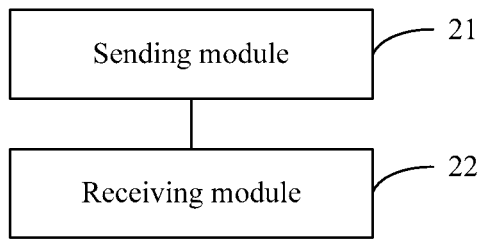
FIG. 13 is a schematic structural diagram of a network device according to Embodiment 4.

FIG. 13 is a schematic structural diagram of a network device according to Embodiment 4. As shown in FIG. 13, the network device provided in this embodiment includes:

a sending module 21, configured to send a first downlink signal to a terminal device in a first time unit of a first carrier, where the first carrier is a time division duplex TDD carrier, and the first time unit includes a first slot or a first subframe; and a receiving module 22, configured to receive first feedback information that is for the first downlink signal and that is sent by the terminal device on the second last symbol and/or the last symbol of a second time unit of a second carrier.

Optionally, the sending module 21 is further configured to send, to the terminal device, a correspondence between a time unit for receiving a downlink signal on the first carrier and a time unit that is of the second carrier and that is for sending feedback information for the downlink signal on the first carrier, to determine the second time unit, where the correspondence is determined based on a TDD configuration of the first carrier.

Optionally, a periodicity of the TDD configuration of the first carrier is 2.5 milliseconds, the periodicity of the TDD configuration includes five slots, the third slot in the periodicity of the TDD configuration is an uplink slot, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

Optionally, a periodicity of the TDD configuration of the first carrier is 5 milliseconds, the periodicity of the TDD configuration includes 10 slots, the fifth slot and the sixth slot in the periodicity of the TDD configuration are uplink slots, and remaining slots are downlink slots.

The correspondence is (X, Y, Z), where X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) includes at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

Optionally, the first carrier is a carrier used in a first radio access technology, the second carrier is a carrier used in a second radio access technology, and the terminal device performs dual connectivity DC communication by using the first radio access technology and the second radio access technology.

Optionally, a subcarrier spacing used in the first radio access technology is greater than a subcarrier spacing used in the second radio access technology.

The network device in this embodiment may be configured to perform the method provided in Embodiment 2. Specific implementations and technical effects are similar, and details are not described herein again.

Figure 14:
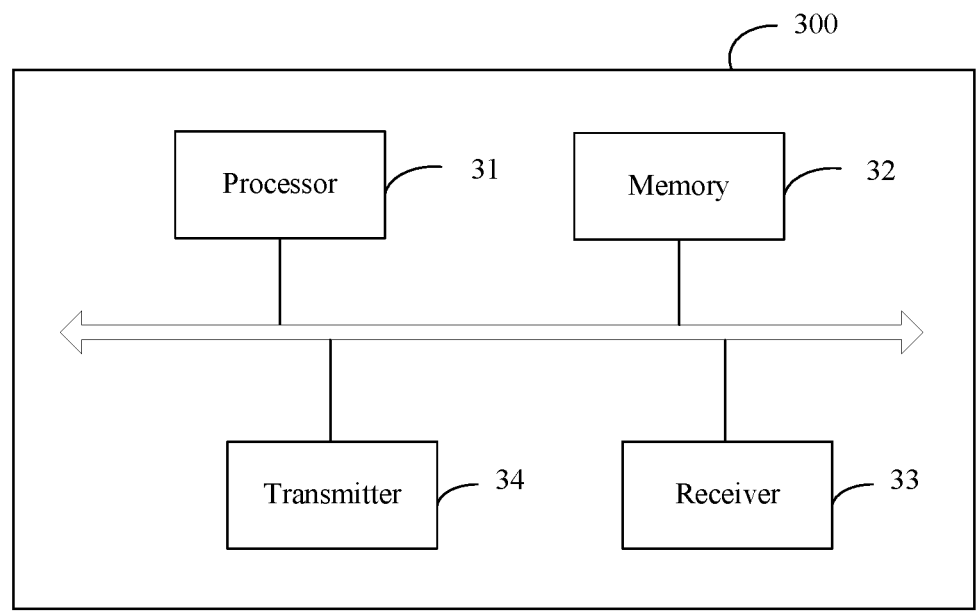
FIG. 14 is a schematic structural diagram of a terminal device according to Embodiment 5.

FIG. 14 is a schematic structural diagram of a terminal device according to Embodiment 5. As shown in FIG. 14, the terminal device 300 provided in this embodiment includes a processor 31, a memory 32, a receiver 33, and a transmitter 34. The memory 32, the receiver 33, and the transmitter 34 are connected to and communicate with the processor 31 by using a bus. The memory 32 is configured to store a computer executable instruction. The processor 31 is configured to execute the computer executable instruction, so that the terminal device 300 performs the method in Embodiment 1. Specific implementations and technical effects are similar, and details are not described herein again.

Figure 15:
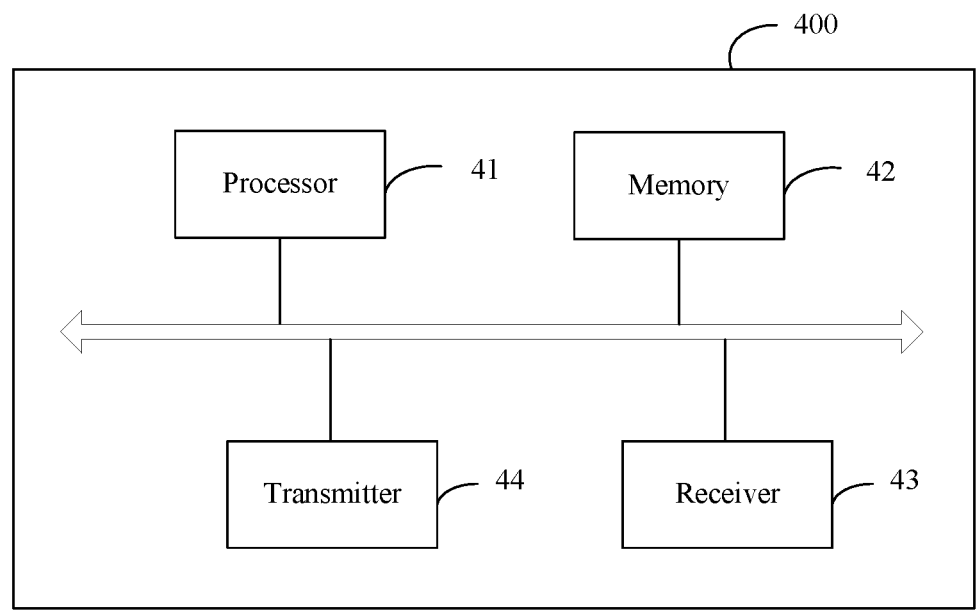
FIG. 15 is a schematic structural diagram of a network device according to Embodiment 5.

FIG. 15 is a schematic structural diagram of a network device according to Embodiment 5. As shown in FIG. 15, the terminal device 400 provided in this embodiment includes a processor 41, a memory 42, a receiver 43, and a transmitter 44. The memory 42, the receiver 43, and the transmitter 44 are connected to and communicate with the processor 31 by using a bus. The memory 42 is configured to store a computer executable instruction. The processor 41 is configured to execute the computer executable instruction, so that the network device 400 performs the method in Embodiment 1. Specific implementations and technical effects are similar, and details are not described herein again.

It may be understood that the processor used by the network device and the terminal device in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors or a combination of a DSP and a microprocessor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer readable storage medium. The software functional unit is stored in a storage medium and includes several instructions for instructing a computer device (which may be a personal computer, a server, a network device, or the like) or a processor to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A signal sending and receiving method, comprising:
receiving, by a terminal device, a first downlink signal from a network device in a first time unit of a first carrier, wherein the first carrier is a time division duplex TDD carrier, and the first time unit comprises a first slot or a first subframe;
determining, by the terminal device, a second time unit used to send first feedback information for the first downlink signal on a second carrier, wherein the second carrier is a frequency division duplex FDD uplink carrier, and the second time unit comprises a second slot or a second subframe;
sending, by the terminal device, the first feedback information to the network device on at least one of a second last symbol and a last symbol of the second time unit of the second carrier, wherein when the second time unit overlaps a first uplink slot of the first carrier in terms of time, determining, by the terminal device, to discard last two symbols of the first uplink slot; and
sending, by the terminal device, an acknowledgement (ACK)/negative acknowledgement (NACK) on the second carrier at a position corresponding to the discarded symbols of the first uplink slot of the first carrier.

2. The method according to claim 1, wherein the determining, by the terminal device, the second time unit used to send feedback information for the first downlink signal on the second carrier comprises:
determining, by the terminal device, the second time unit based on a correspondence between a time unit for receiving the first downlink signal on the first carrier and a time unit that is of the second carrier and that is for sending the feedback information for the first downlink signal on the first carrier, wherein the correspondence is determined based on an uplink and downlink transmission direction configuration of the first carrier.

3. The method according to claim 2, wherein a periodicity of the uplink and downlink transmission direction configuration of the first carrier is 2.5 milliseconds, the periodicity of the uplink and downlink transmission direction configuration comprises five slots, a third slot in the periodicity of the uplink and downlink transmission direction configuration is an uplink slot, and a plurality of remaining slots are downlink slots; and
the correspondence is (X, Y, Z), wherein X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) comprises at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

4. The method according to claim 2, wherein a periodicity of the uplink and downlink transmission direction configuration of the first carrier is 5 milliseconds, the periodicity of the uplink and downlink transmission direction configuration comprises 10 slots, a fifth slot and a sixth slot in the periodicity of the uplink and downlink transmission direction configuration are uplink slots, and a plurality of remaining slots are downlink slots; and
the correspondence is (X, Y, Z), wherein X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) comprises at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

5. The method according to claim 1, further comprising:
when a previous slot adjacent to the first uplink slot in terms of time is a first downlink slot, determining, by the terminal device, not to receive a signal on last m symbols of the first downlink slot, or determining, by the terminal device, not to send a signal on first m symbols of the first uplink slot, wherein the value of m comprises 1 or 2, and the last m symbols of the first downlink slot or the first m symbols of the first uplink slot are a guard period GP.

6. The method according to claim 1, wherein the sending, by the terminal device, the first feedback information to the network device on at least one of the second last symbol and the last symbol of the second time unit of the second carrier comprises:
sending, by the terminal device, the first feedback information on the last symbol of the second time unit by using a subcarrier spacing of 15 KHz; or
sending, by the terminal device, the first feedback information on at least one of the second last symbol and the last symbol of the second time unit by using a subcarrier spacing of 30 KHz.

7. The method according to any one of claim 1, wherein the first carrier is a carrier used in a first radio access technology, the second carrier is a carrier used in a second radio access technology, and the terminal device performs dual connectivity DC communication by using the first radio access technology and the second radio access technology.

8. The method according to claim 7, wherein a subcarrier spacing used in the first radio access technology is greater than a subcarrier spacing used in the second radio access technology.

9. A terminal device, comprising:
a receiving module, configured to receive a first downlink signal from a network device in a first time unit of a first carrier, wherein the first carrier is a time division duplex TDD carrier, and the first time unit comprises a first slot or a first subframe;
a determining module, configured to determine a second time unit used to send first feedback information for the first downlink signal on a second carrier, wherein the second carrier is a frequency division duplex FDD uplink carrier, and the second time unit comprises a second slot or a second subframe;

a sending module, configured to send the first feedback information to the network device on at least one of a second last symbol and a last symbol of the second time unit of the second carrier, wherein when the second time unit overlaps a first uplink slot of the first carrier in terms of time, determining to discard last two symbols of the first uplink slot; and sending, by the terminal device, an acknowledgement (ACK/negative acknowledgement (NACK) on the second carrier at a position corresponding to the discarded symbols of the first uplink slot of the first carrier.

10. The terminal device according to claim 9, wherein the determining module is specifically configured to:

determine the second time unit based on a correspondence between a time unit for receiving a downlink signal on the first carrier and a time unit that is of the second carrier and that is for sending feedback information for the downlink signal on the first carrier, wherein the correspondence is determined based on an uplink and downlink transmission direction configuration of the first carrier.

11. The terminal device according to claim 10, wherein a periodicity of the uplink and downlink transmission direction configuration of the first carrier is 2.5 milliseconds, the periodicity of the uplink and downlink transmission direction configuration comprises five slots, a third slot in the periodicity of the uplink and downlink transmission direction configuration is an uplink slot, and a plurality of remaining slots are downlink slots; and the correspondence is (X, Y, Z), wherein X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) comprises at least one of (0, 0, 1), (1, 1, 3), (3, 2, 5), (4, 2, 5), (5, 3, 7), (6, 3, 7), (8, 4, 9), (9, 5, 11), (10, 5, 11), (11, 6, 13), (13, 7, 15), (14, 7, 15), (15, 8, 17), (16, 8, 17), (18, 9, 19), and (19, 0, 1).

12. The terminal device according to claim 10, wherein a periodicity of the uplink and downlink transmission direction configuration of the first carrier is 5 milliseconds, the periodicity of the uplink and downlink transmission direction configuration comprises 10 slots, a fifth slot and a sixth slot in the periodicity of the uplink and downlink transmission direction configuration are uplink slots, and a plurality of remaining slots are downlink slots; and the correspondence is (X, Y, Z), wherein X is a slot number of the time unit for receiving the downlink signal on the first carrier, Y is a subframe number of the time unit that is of the second carrier and that is for sending the feedback information for the downlink signal on the first carrier, Z is a slot number of the time unit that is of the second carrier and that is for sending the feedback information for the downlink signal on the first carrier, and a value of (X, Y, Z) comprises at least one of (0, 0, 1), (1, 1, 3), (2, 1, 3), (3, 2, 5), (6, 3, 7), (7, 4, 9), (8, 4, 9), (9, 5, 11), (10, 5, 11), (11, 6, 13), (12, 6, 13), (13, 7, 15), (16, 8, 17), (17, 9, 19), (18, 9, 19), and (19, 0, 1).

13. The terminal device according to claim 9, wherein the determining module is further configured to:

when a previous slot adjacent to the first uplink slot in terms of time is a first downlink slot, determine not to receive a signal on last m symbols of the first downlink slot, or determine not to send a signal on first m symbols of the first uplink slot, wherein the value of m comprises 1 or 2, and the last m symbols of the first downlink slot or the first m symbols of the first uplink slot are a guard period GP.

14. The terminal device according to any one of claim 9, wherein the sending module is specifically configured to:

send the first feedback information on the last symbol of the second time unit by using a subcarrier spacing of 15 KHz; or send the first feedback information on at least one of the second last symbol and the last symbol of the second time unit by using a subcarrier spacing of 30 KHz.

15. The terminal device according to claim 9, wherein the first carrier is a carrier used in a first radio access technology, the second carrier is a carrier used in a second radio access technology, and the terminal device performs dual connectivity DC communication by using the first radio access technology and the second radio access technology.

16. The terminal device according to claim 15, wherein a subcarrier spacing used in the first radio access technology is greater than a subcarrier spacing used in the second radio access technology.

17. A signal sending and receiving method, comprising:

sending, by a network device, a first downlink signal to a terminal device in a first time unit of a first carrier, wherein the first carrier is a time division duplex TDD carrier, and the first time unit comprises a first slot or a first subframe; and receiving, by the network device, first feedback information that is for the first downlink signal and that is sent by the terminal device on at least one of a second last symbol and a last symbol of a second time unit of a second carrier, wherein when the second time unit overlaps a first uplink slot of the first carrier in terms of time, a signal on last two symbols of the first uplink slot is not received; and receiving, by the network device, an acknowledgement (ACK)/negative acknowledgement (NACK) on the second carrier at a position corresponding to the last two symbols of the first uplink slot of the first uplink slot of the first carrier.

18. The method according to claim 17, further comprising:

sending, by the network device to the terminal device, a correspondence between a time unit for receiving a downlink signal on the first carrier and a time unit that is of the second carrier and that is for sending feedback information for the downlink signal on the first carrier, to determine the second time unit, wherein the correspondence is determined based on an uplink and downlink transmission direction configuration of the first carrier.

* * * * *